(12) United States Patent
Sikora et al.

(10) Patent No.: US 9,804,030 B2
(45) Date of Patent: Oct. 31, 2017

(54) METHOD AND DEVICE FOR CONTACTLESSLY DETERMINING THE TEMPERATURE OF A MOVING OBJECT HAVING AN UNKNOWN DEGREE OF EMISSION

(71) Applicant: Sikora AG, Bremen (DE)

(72) Inventors: Harald Sikora, Bremen (DE); Abraham Parga Garcia, Bremen (DE)

(73) Assignee: Sikora AG, Bremen (DE)

( * ) Notice: Subject to any disclaimer, the term of this patent is extended or adjusted under 35 U.S.C. 154(b) by 295 days.

(21) Appl. No.: 14/651,979

(22) PCT Filed: Dec. 13, 2013

(86) PCT No.: PCT/EP2013/076553
§ 371 (c)(1),
(2) Date: Jun. 12, 2015

(87) PCT Pub. No.: WO2014/090994
PCT Pub. Date: Jun. 19, 2014

(65) Prior Publication Data
US 2015/0316417 A1   Nov. 5, 2015

(30) Foreign Application Priority Data
Dec. 14, 2012 (DE) .................. 10 2012 024 418

(51) Int. Cl.
*G01J 5/00* (2006.01)
*G01J 5/08* (2006.01)

(52) U.S. Cl.
CPC .......... *G01J 5/0022* (2013.01); *G01J 5/0096* (2013.01); *G01J 5/0887* (2013.01); *G01J 5/0896* (2013.01);
(Continued)

(58) Field of Classification Search
CPC ...... G01J 5/0022; G01J 5/0096; G01J 5/0887; G01J 5/0896; G01J 2005/0051; G01J 2005/0077
(Continued)

(56) References Cited

U.S. PATENT DOCUMENTS 3,884,075 A    5/1975  Brandli et al.
3,973,122 A *  8/1976  Goldberg ........... G01B 11/0625
                                                    250/338.1
(Continued)

FOREIGN PATENT DOCUMENTS

CN    102795627 A    11/2012
DE    21 50 963 A1   10/1971
(Continued)

OTHER PUBLICATIONS

Translation of the International Preliminary Report on Patentability in International Application No. PCT/EP2013/076553 mailed Jun. 18, 2015.

*Primary Examiner* — Lisa Caputo
*Assistant Examiner* — Nathaniel T Woodward
(74) *Attorney, Agent, or Firm* — Young Basile Hanlon & MacFarlane, P.C.

(57) ABSTRACT

A method for contactlessly determining the temperature of a moving object having an unknown degree of emission, especially a metal wire conveyed along its longitudinal axis, is described. The object is guided through at least one radiation source emitting thermal radiation, wherein the object is mostly or completely surrounded by the at least one radiation source. With at least one radiation detector, a spatially-resolved thermal radiation measurement is performed in a region through which the object passes when it is guided through the radiation source. The temperature of the moving object is determined on the basis of the spatially- (Continued)

resolved thermal radiation measurement. A corresponding device is also described.

20 Claims, 4 Drawing Sheets

(52) U.S. Cl.
CPC ............... *G01J 2005/0051* (2013.01); *G01J 2005/0077* (2013.01)

(58) Field of Classification Search
USPC ............ 374/121, 120, 100, 124, 163, 141
See application file for complete search history.

(56) References Cited

U.S. PATENT DOCUMENTS

| | | | |
|---|---|---|---|
| 4,015,476 A | 4/1977 | Roche et al. | |
| 4,316,088 A * | 2/1982 | Corbier | G01J 5/0022 250/338.1 |
| 4,409,042 A * | 10/1983 | Dornberger | G01J 5/0022 148/239 |
| 4,566,809 A * | 1/1986 | Arnaud | G01J 5/0022 250/353 |
| 5,271,084 A * | 12/1993 | Vandenabeele | G01J 5/0003 219/411 |
| 6,717,675 B1 * | 4/2004 | Munch | G01N 21/8914 250/559.09 |
| 7,044,634 B2 * | 5/2006 | Sandvoss | G01N 25/72 374/121 |
| 2010/0292951 A1 * | 11/2010 | Gaertner | G01J 5/0022 702/135 |

FOREIGN PATENT DOCUMENTS

| | | |
|---|---|---|
| DE | 20 2004 004 402 U1 | 12/2004 |
| EP | 0 476 611 A2 | 9/1991 |
| EP | 0 458 388 B1 | 8/1994 |
| JP | H3-51725 A | 3/1991 |
| JP | 2003-214956 A | 7/2002 |

* cited by examiner

METHOD AND DEVICE FOR CONTACTLESSLY DETERMINING THE TEMPERATURE OF A MOVING OBJECT HAVING AN UNKNOWN DEGREE OF EMISSION

TECHNICAL FIELD

The invention relates to a method and a device for contactlessly determining the temperature of a moving object having an unknown degree of emission, especially of a metal wire conveyed along its longitudinal axis.

BACKGROUND

Metal wires conveyed along a longitudinal axis serve, for example, as conductors of electrical cables. They possess a diameter within the range of 0.1 to 100 mm and are conveyed by appropriate guide apparatus along their longitudinal direction, for example to extrusion devices in which an insulation sheath is applied to the metal wires. Inter alia for the extrusion process but also, e.g., for a preceding preheating, curing or hardening process, it is necessary for the moved metal wires to possess a set temperature. In the production of cores, it is important for the insulation to adhere to the connector. To this end, the conductor is heated directly before entering the extruder. In addition, a constant conductor temperature is particularly important when the insulation of a conductor is foamed. This is particularly the case with data transmission lines.

SUMMARY

For the reasons above, a need therefore exists to measure the temperature of such moving objects and regulate it to a setpoint if necessary.

Contactless temperature measurements are performed with so-called pyrometers that can detect the thermal radiation emitted by the objects to be measured. Known pyrometers work for example within an infrared wavelength range such as from 2 to 15 µm. As is known, the thermal radiation is determined using three parameters according to the following equation:

$$e+r+t=1 \qquad \text{Eq. (1)}$$

where e designates the degree of emission, r designates the degree of reflection, and t designates the degree of transmission. With the present objects to be measured, it can be assumed that the degree of transmission for metals is basically zero within an infrared measuring range. The above equation (1) can therefore be simplified as follows:

$$e+r=1 \qquad \text{Eq. (2)}$$

With an ideal black radiator, the degree of reflection is zero, i.e., e=1. With real objects such as metal wires, the degree of reflection r is generally much greater than the degree of emission e. In addition, the degree of emission changes depending on factors such as the surface quality or the temperature. In practice, the degree of emission of the moving object to be measured is therefore frequently unknown.

Methods are already known by means of which the temperature of objects having an unknown degree of emission e can be measured contactless. By externally irradiating the object to be measured, the amount of radiation which is less than 1, given the degree of emission e<1 in the equation e+r=1, is compensated by the external radiation. In particular, the thermal radiation directed from the external radiation source to the object to be measured is reflected by the object according to its degree of reflection r so that the missing part of thermal radiation is more or less "filled up" to 1 by external radiation. On this basis, contactless temperature sensors in radiation pyrometers can be calibrated to reproducible measured temperature values such as ° C.

Such a method with external irradiation is, for example, known from DE 691 03 207 T2. In the known method, a large-surface wafer arranged in a stationary manner is measured in a treatment chamber. In the contactless temperature measurement of small objects such as thin metal wires, the alignment of the temperature sensor relative to the object to be measured is, however, problematic. This is particularly true when the object to be measured is not fixed and is moving instead. In particular, such movement can cause the object to be measured to move out of the measuring field of the temperature sensor, either completely or partially. In both cases, incorrect measurements arise. This also holds true when the moving object is not within the plane of optimum definition (focus) of the contactless temperature sensor, and the measuring spot can therefore be larger than the object to be measured. U.S. Pat. No. 4,409,042 A describes a method for the contactless measurement of the temperature of a copper wire moved along its longitudinal direction in which the copper wire is guided through a parabolic reflector arrangement. The parabolic reflector arrangement possesses highly reflective surfaces and reflects radiation within its focal point or respectively its focal axis. An infrared detector is focused on this focal point, or respectively a point on the focal axis. In this manner, reliable temperature measurement is possible, even of moving copper wires subject to vibration. This method is, however, substantially complex. It was also revealed in practice that the temperature measurement does not always supply the necessary precision.

In contrast, the teachings herein provide a method and a device by means of which precise, always reliable, contactless temperature measurement of moving objects, even with small diameters, is feasible.

One embodiment of the invention is a method for contactlessly determining the temperature of a moving object having an unknown degree of emission, especially a metal wire conveyed along its longitudinal axis, comprising steps wherein: the object is guided through at least one radiation source emitting thermal radiation, wherein the object is mostly or completely surrounded by the at least one radiation source; with at least one radiation detector, a spatially-resolved thermal radiation measurement is performed in a region through which the object passes when it is guided through the radiation source; and the temperature of the moving object is determined on the basis of the spatially-resolved thermal radiation measurement.

Furthermore, an embodiment of the invention includes a device for contactlessly determining the temperature of a moving object having an unknown degree of emission, in particular a metal wire conveyed along its longitudinal axis. The device comprises least one radiation source emitting thermal radiation and a guidance device by means of which the moving object can be guided through the at least one radiation source, wherein the object is mostly or completely surrounded by the at least one radiation source; at least one radiation detector that is designed to perform a spatially-resolved measurement of thermal radiation in a region through which the object passes when it is guided through the radiation source; and an evaluation apparatus which is designed to determine the temperature of the moving object on the basis of the spatially-resolved thermal radiation measurement.

The method or the device serves for example to determine or measure the temperature of a moving metal wire. As explained above, such a metal wire can, for example, be an electric conductor for a cable. It can correspondingly be, e.g., a copper wire or the like. Such metal wires are, for example, conveyed along their longitudinal direction to be guided through an extrusion device in which an insulation sheath made of plastic is extruded onto the metal wire. As also mentioned above, it is important to measure the temperature of such moving objects and regulate it to a setpoint if necessary. The degree of emission of the objects to be measured according to the invention is unknown. It is in any case less than 1 since it is not a black radiator. For example, the degree of emission of a copper wire is significantly less than 0.1. Since the degree of transmission approaches zero at least within the infrared measuring range of metals such as copper, the degree of reflection is very high.

According to embodiments of the invention, the thermal radiation reflected by the moving object to be measured originates from the at least one (external) radiation source. The radiation source can be heated by a suitable heating apparatus and emits specific and calibratable thermal radiation depending on its temperature. The moving object is guided through the radiation source and is at least mostly, and in particular almost completely, surrounded by the radiation source during its guidance through the radiation source. Of course it is always the section which is being guided through the radiation source of, e.g., a moving metal wire that is mostly or completely surrounded by the radiation source. In this context, "mostly" means that the majority of the surface is surrounded by the radiation source. A slit for introducing the metal wire at a location in the perimeter irrelevant to the optical function would probably not really matter. The moving object emits thermal radiation within the infrared range depending on its temperature to be determined. In addition, the object reflects the thermal radiation emitted by the radiation source. The reflected part in equation 2 above is "filled up" to 1 in a known manner by the thermal radiation emitted by the radiation source serving as the compensation radiation source.

The at least one radiation detector, which in particular can be a pyrometer, detects all the thermal radiation, that is, on the one hand the thermal radiation emitted by the at least one radiation source (and also reflected given a non-black radiator). On the other hand, the at least one radiation detector detects the thermal radiation emitted and reflected by the moving object. Accordingly, a clearly defined and calibratable measuring environment is created according to the teachings herein, even for moving objects with small dimensions in which temperature measurement is also feasible even when the degree of emission is unknown.

Furthermore, contactless, spatially-resolved measurement of thermal radiation occurs according to embodiments of the invention. For spatially-resolved measurement, the at least one radiation detector scans the region in which the object to be measured is anticipated. The spatially-resolved thermal radiation measurement can be carried out with at least one infrared radiation detector or the like. Correspondingly, the at least one radiation detector can comprise at least one infrared radiation detector or the like. The scanning can for example be carried out by moving, especially swinging, the at least one radiation detector. It is also possible to perform the spatially-resolved thermal radiation measurement by means of a spatially-resolving radiation detector, in particular a thermal imaging camera. A spatially-resolving radiation detector can, for example, be a one-dimensional line sensor, or a two-dimensional bolometric sensor array.

The temperature of the radiation source surrounding the object to be measured can be measured and is therefore known. The object to be measured in the spatially-resolved measurement, such as in a video signal of a thermal imaging sensor (line or image sensor), becomes invisible when its temperature corresponds to that of the surrounding radiation source. Deviating temperatures are manifested with lower or higher measurement levels in the spatially-resolved thermal radiation measurement depending on whether the temperature of the object to be measured is lower or higher than the temperature of the surrounding radiation source. In determining the temperature of strand-shaped products such as metal wires in a spatially-resolved measurement, it can be ensured that they are at least temporarily in a plane of optimum sharpness (measuring focus of the radiation detector) given their extension in the longitudinal direction. According to the teachings herein, it is hence possible to precisely and reliably determine the temperature of even such objects with an unknown degree of emission having small diameters contactlessly, in particular smaller than the measuring field of the radiation detector, that for example results with a thermal imaging camera from the pixel area and optical image scale.

The at least one radiation source should preferably be designed as a black body. As is known, a black radiator is an idealization with a degree of emission of 1. According to this embodiment, such a black radiator is approximated to the extent that it is practically feasible and useful. As is known, a good approximation of a black radiator is a so-called cavity radiator with an inner surface that can be provided with a black coating. Correspondingly, the at least one radiation source can comprise a cavity radiator with an inlet opening and an outlet opening, wherein the object is guided through the inlet opening and the outlet opening through the cavity radiator, and wherein the cavity radiator comprises at least one measuring opening through which the spatially-resolved thermal radiation measurement occurs. In this embodiment, the object to be measured is guided into the cavity radiator through the inlet opening and guided out through the outlet opening. In addition, the cavity radiator possesses at least one measuring opening that in particular is formed separately from the inlet opening and outlet opening. The cavity radiator can, for example, be a hollow cylinder. The inlet opening and outlet opening can then be arranged in the opposite faces of the hollow-cylindrical cavity radiator that are otherwise sealed. The at least one measuring opening can then offer the radiation detector the necessary view into the interior of the cavity radiator in the region of the cylindrical surface of the hollow-cylindrical cavity radiator.

According to another embodiment, the spatially-resolved thermal radiation measurement can be through the at least one measuring opening in a direction that is at an angle relative to the longitudinal axis of the object which normally corresponds to the direction of movement of the object through the cavity radiator, in particular at an angle of 30° to 60°. The direction of measurement is defined by the alignment of the radiation detector, for example a thermal imaging camera. It is also designated the primary direction of measurement. When a focusing lens system is used, the primary direction of measurement is in particular along the optical axis of the focusing lens system. When the radiation detector such as a thermal imaging camera comprises a two-dimensional sensor array, the primary direction of measurement in general lies centrally perpendicular on the array plane of the sensor array. To the extent that the at least one radiation detector is swung about a pivot axis, the connection between the pivot axis and measuring opening forms the primary direction of measurement. The oblique alignment can run in the direction of movement of the object. Furthermore, the at least one radiation detector, such as a spatially-resolving thermal imaging camera, can be aligned so that spatially-resolved temperature measurement occurs at least transversely to the direction of movement of the object. In addition to the moving object to be measured, the radiation detector also detects the radiation source designed as a so-called black radiator surrounding the object.

The oblique alignment of the radiation detector relative to the direction of movement of the moving object prevents the unavoidable measuring opening of the cavity radiator from having an undesirable influence on the measuring results. In particular, the measuring opening offset relative to the actual measuring site in the direction of movement of the object does not impair the very closely approximated properties of a black cavity radiator. An angular range of 30° to 60°, such as approximately 45°, has proven to be particularly suitable in this regard. In addition, the object to be measured is also reliably detected when it deviates horizontally or vertically relative to the line of sight of the radiation detector as long as the object to be measured is still located within the viewing range of the radiation detector, such as a thermal imaging camera. In addition to the object to be measured, a thermal imaging camera detects the radiation of the cavity radiator in its background, whereas the object to be measured is simultaneous irradiated by the cavity radiator and therefore experiences the necessary supplement for the reflection r=1−e. In this embodiment as well, the object to be measured becomes therefore invisible when its temperature corresponds with that of the cavity radiator. Independent of the horizontal or vertical offset from the mid-axis of, e.g., a thermal imaging camera at which the object to be measured passes through the visual field of the thermal imaging camera, the object to be measured is always detected at least temporarily in the plane of optimum sharpness (measuring focus) while it continues to advance.

According to another embodiment, the temperature of the moving object can be determined by evaluating a difference between the measured thermal radiation emitted and possibly reflected by the at least one radiation source, and the measured thermal radiation emitted and reflected by the moving object. The difference can be measured both in space and in time. The spatially-resolved temperature measurement leads to a deviation in the measured intensity in the region of the object to be measured when there is a difference in temperature between the object to be measured and the radiation source surrounding it. This deviation in measured intensity, be it positive or negative, relative to the intensity in the thermal radiation of the radiation source, which is also measured, can be evaluated given the spatial resolution. It is therefore possible to evaluate a difference between a minimum and a maximum in a diagram recorded during the spatially-resolved measurement of intensity. When the temperature of the radiation source is known, the temperature of the object to be measured can be determined therefrom. It is for example also possible to continuously determine an average intensity over the measured region in the sense of measuring differences over time, and determine the change of this average when the object to be measured enters the measuring field. If this deviation in the average is for example 0, the object to be measured possesses the same temperature as the surrounding radiation source.

According to another embodiment, the radiation detector for the spatially-resolved thermal radiation measurement can be directed toward the measuring opening of the cavity detector and toward a section of the outer surface of the cavity detector, in particular delimiting the measuring opening, wherein the thermal radiation emitted and possibly reflected by the cavity radiator in the section of the outer surface of the cavity radiator is used to form the difference. This method ensures that actually only the thermal radiation emitted and possibly reflected by the cavity radiator, and not inadvertently thermal radiation from the moving object, is used to form the difference from the thermal radiation emitted and reflected by the moving object. Due to vibrations, the exact position is not known with sufficient precision of quickly moving objects such as electrical conductors, which move for example faster than 20 m/s.

According to another embodiment, the radiation detector for the spatially-resolved measurement can detect a first region through the measuring opening in which the moving object is located below the measuring opening relative to its direction of movement, as well as a second region in which the moving object is not below the measuring opening when viewed perpendicular to its direction of movement. It is then also possible to detect a position of the moving object using the measured values from the first region and deduce therefrom a position of the moving object in the second region, wherein the thermal radiation emitted and reflected by the moving object measured in this position of the second region is used to form the difference. In this region in which the moving object is below the measuring opening when viewed perpendicular to its direction of movement, the moving object is not exposed to the thermal radiation of the at least one cavity radiator. Consequently, the object in this region is perceived as being significantly colder by the radiation detector and is very easy to discriminate relative to the surroundings in the spatially-resolved measurement. In this way, the position which is in particular not known with sufficient precision for quickly moving objects can be precisely determined. With this knowledge of the position, the measuring section in the second region can be reliably inferred in which the object is necessarily located. This measuring section is then considered in forming the difference.

As already explained, the temperature of the least one radiation source can also be measured with an additional temperature sensor. It is also possible to regulate the temperature of the least one radiation source to a set temperature value with this additional temperature sensor. The knowledge of the temperature of the at least one radiation source is especially important for determining the absolute temperature of the object to be measured, especially in a measurement of difference. It is also possible to regulate the at least one radiation source to a target temperature of the moving object to be measured. Then, e.g., a signal can be output when the measurement indicates that the object possesses a temperature deviating from the temperature of the radiation source and hence from the target temperature. On this basis, the temperature of the moving object can be adjusted by means of a suitable regulation apparatus to, e.g., a setpoint of the same size.

It is also conceivable to change the temperature of the at least one radiation source by means of a suitable heating apparatus until a difference between the measured thermal radiation emitted and possibly reflected by the at least one radiation source and the measured thermal radiation emitted and reflected by the moving object is as close to zero as possible. The spatially-resolved measured intensity signal is then largely constant over the detected region. In particular, the signal does not possess any significant deviation in the region of the moving object. Furthermore, the temperature of the at least one radiation source can be measured by means of a temperature sensor. The temperature of the moving object can then be inferred from the temperature of the radiation source measured while the intensity signal is constant.

A thermal imaging camera can generally measure temperatures when the degree of emission is known, which is the case in particular with so-called black bodies with a degree of emission of approximately 1. A thermal imaging camera provided according to the invention, for example, could also measure and possibly also regulate the temperature of the thermal radiator. Black bodies can degenerate in practice, for example from moisture, dirt or abrasion. In this case, the temperature detected by the thermal imaging camera would be less than actually exists. Soiling the lens of the thermal imaging camera also causes very similar measuring errors. The radiation source is therefore usefully regulated by a temperature sensor. Deviations in the temperature of the radiation source detected with the assistance of the radiation detector when the radiation source is soiled can also be used to correct the detection of the measured values and generate an error message if the deviation is too great.

According to another embodiment, a dimension, especially a diameter, of the moving object can be determined from a difference between the measured thermal radiation emitted by the at least one radiation source and the measured thermal radiation emitted and reflected by the moving object. The determination of the dimensions of the moving object, especially a diameter of a metal wire, is enabled by the spatially-resolved measurement according to embodiments herein as long as there is a difference in temperature between the radiation source and the object moving through the radiation source. To determine such a dimension or respectively a diameter, the spatially-resolved measurement of the thermal radiation intensity is evaluated. To enable measurement, a difference in temperature between the object to be measured and the at least one radiation source can be adjusted in a targeted manner.

According to another embodiment, the at least one radiation source can be a hood heated with a heat source which surrounds a wheel, in the running surface of which a groove is formed in which the moving object is guided. The wheel can be rotatably mounted. It can also be rotatably driven by means of a suitable drive apparatus. By means of the heat source, the wheel can be brought to a target temperature and also regulated to this temperature if applicable. This embodiment is particularly advantageous with strongly vibrating objects such as thin metal wires. The groove brings about stabilization in the position of the object relative to its distance from the temperature sensor, which in turn facilitates the determination of the temperature. At the same time, given a sufficient groove depth, the moving object can be at least mostly surrounded by the one radiation source to yield the measuring environment defined according to an embodiment of the invention. The groove can possess a depth which is twice as large as the width of the groove. It can also be at least three times or at least four times as deep as it is wide, however. To the extent that the groove depth is an uneven depth, e.g., has a V- or U-shaped cross-section, the referenced width is the average width, i.e., especially an average of the width formed over the depth of the groove. The running surface and the groove can furthermore be provided with a black coating in order to very closely approximate a black radiator.

The spatially-resolved measurement can occur at least transversely to the direction of movement of the object. The at least one radiation detector is correspondingly moved or respectively aligned so that, for example, its one-dimensional sensor line is perpendicular to the direction of movement of the object. The possibly missing portion of the thermal radiation given the outwardly-facing wire surface that is not surrounded by the groove can be compensated by an additional radiation source from outside the wheel. To this end, the running surface and the groove can be at least sectionally covered by another radiation source, especially by a radiation source with a U-shaped cross section. This additional radiator approximating a black radiator as closely as possible can cover the running surface with the groove and the moving object guided therein, such as a metal wire, like a hood. This further improves the enclosure of the moving object, and a further defined and trouble-free measuring environment is provided. With this embodiment as well, measurement can occur along a primary direction of measurement oblique to the direction of movement of the object to be measured.

Based on the detected temperature of the moving object, the temperature of the moving object can be regulated to a setpoint. With the assistance of a temperature sensor or an additional contactless temperature sensor attached on the side, it is also possible to precisely measure and regulate the temperature of the radiation source, such as a heated disk, and especially the temperature of the running surface (groove) at that location.

BRIEF DESCRIPTION OF THE DRAWINGS

Exemplary embodiments of the invention are explained below in greater detail with reference to figures. In the drawings.

DETAILED DESCRIPTION

Figure 1:
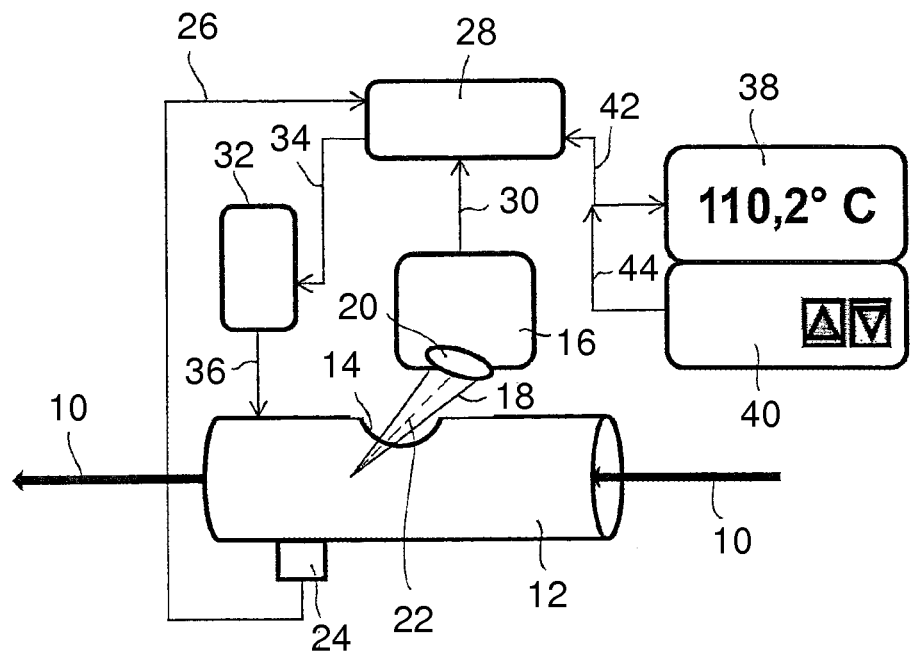
FIG. 1 is a device according to a first embodiment of the invention for performing the method according to the first embodiment of the invention.

The device schematically shown in FIG. 1 is for measuring the temperature of a moving object 10 contactless, in the present case a metal wire 10 conveyed along its longitudinal direction as illustrated by the arrows in FIG. 1. The direction of travel of the object 10 to be measured is inconsequential. The metal wire 10 can, for example, be guided up to an extrusion device in which an insulation sheath made of plastic is extruded onto the metal wire. The device furthermore comprises a radiation source 12, in the present case a hollow-cylindrical cavity radiator which very closely approximates a black radiator. To this end, the inner surface of the cavity radiator 12 is provided with a black coating and possesses an inlet opening for the metal wire 10 provided in its face, which is on the right in FIG. 1 and is otherwise sealed, as well as an outlet opening for the metal wire 10 provided in the opposite face, which is also otherwise sealed. Furthermore, the cavity radiator 12 possesses a measuring opening 14 provided in the region of its lateral surface. Through the measuring opening 14, a radiation detector 16, in the present case a spatially-resolving thermal imaging camera 16, can perform a measurement in the interior of the cavity radiator 12. The measuring field of a central pixel of the thermal imaging camera 16, or the central position of a scanning single sensor of a pyrometer, is illustrated with reference number 18, and an imaging lens system of the thermal imaging camera 16 is illustrated with reference number 20. Reference sign 22 indicates a primary direction of measurement of the thermal imaging camera 16 as a dashed line, which is simultaneously the optical axis of the imaging lens system 20. This primary direction of measurement 22 in the portrayed example runs at an angle of approximately 45° relative to the direction of movement of the metal wire 10, which is simultaneously its longitudinal axis.

A temperatures sensor 24 is assigned to the cavity radiator 12. Measurement data of the temperature sensor 24 is supplied via a connecting line 26 to an evaluation and control apparatus 28 of the device. By means of a connecting line 30, the evaluation and control apparatus 28 is also supplied with measured values from the thermal imaging camera 16. A heating apparatus (not shown) of the cavity radiator 12 can be actuated by means of a semiconductor relay 32, an optorelay or any other actuator 32 through the evaluation and control apparatus 28 via connecting lines 34 and 36 in order to bring the cavity radiator 12 to a set temperature. The device furthermore comprises a display unit 38, which displays a temperature of the metal wire 10 determined by the thermal imaging camera 16, and a control unit 40 by means of which, for example, a setpoint of a temperature of the cavity radiator 12 can be adjusted to precisely detect the temperature of the metal wire 10. Connecting lines 42 and 44 are provided in this regard.

As can be seen in FIG. 1, the metal wire 10 is guided through the cavity radiator 12 during its movement while its section guided through the cavity radiator 12 is almost completely surrounded by the cavity radiator. The thermal imaging camera 16 takes a spatially-resolved thermal radiation measurement through the measuring opening 14. At the same time, the thermal imaging camera 16 is aligned such that the metal wire 10 always remains within the measuring field of the thermal imaging camera 16 during its movement. Based on the temperature of the cavity radiator 12 measured by the temperature sensor 24, the temperature of the metal wire 10 can be determined contactlessly by evaluating the recorded, spatially-resolved intensity curve of the thermal radiation, even when the degree of emission e of the metal wire 10 is unknown. In particular, thermal radiation emitted by the cavity radiator 12 is reflected by the metal wire 10, thereby compensating for the missing amount of radiation r=1−e. The temperature of the metal wire 10 can be determined, for example, on the basis of a differential measurement as explained above. The oblique primary direction of measurement 22 of the thermal imaging camera 16 through the measuring opening 14 relative to the longitudinal direction of the metal wire 10 ensures that the measuring opening 14 has as little influence as possible on the measurement, and hence the very closely approximated properties of a black radiator are retained for the cavity radiator 12.

It is furthermore possible to bring the temperature of the cavity radiator 12 to the target temperature of the metal wire 10. In this case, the display unit 38, for example, could output a signal once the metal wire 10 possesses a temperature different than that of the cavity radiator 12, which is discernible in the spatially-resolved intensity measurement by an upward or downward deviation in intensity. On this basis, a heating apparatus (not shown), by means of which the metal wire 10 is brought to the target temperature, could for example be controlled by a control unit 40, or automatically as well.

Figure 2:
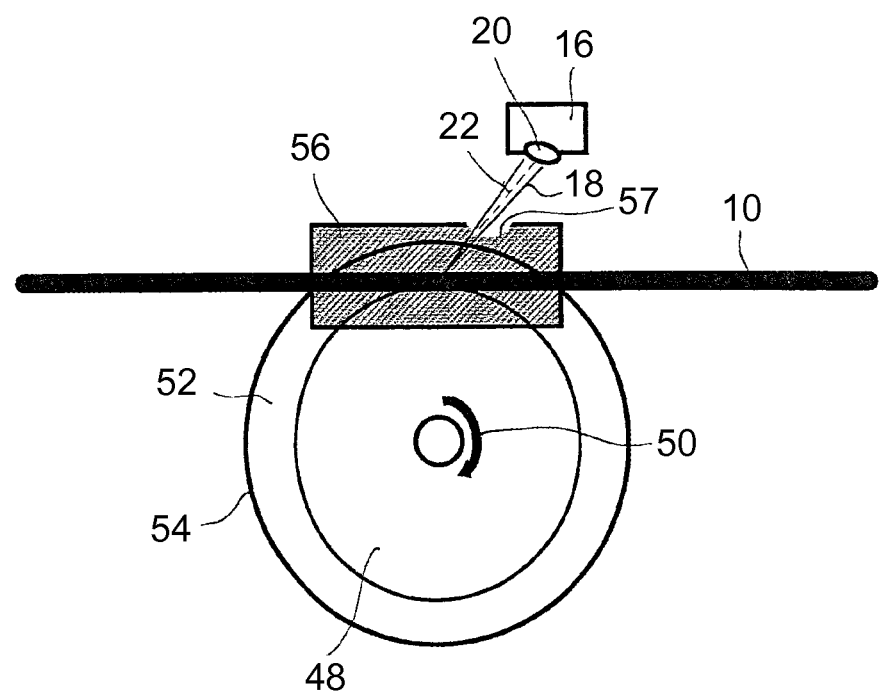
FIG. 2 is a sectional view of a device according to the invention for performing a method according to a second embodiment of the invention.
Figure 3:
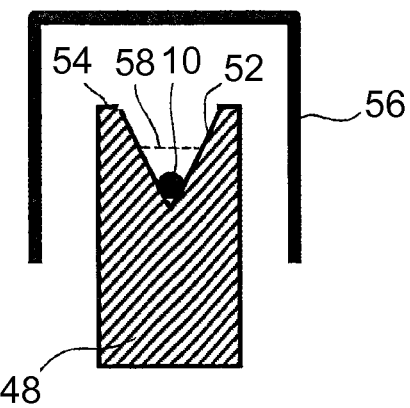
FIG. 3 is the device from FIG. 2 in an additional sectional view.

FIGS. 2 and 3 show a second exemplary embodiment of a device according to the invention. FIG. 3 shows an enlarged detail of a part of the device from FIG. 2. In FIGS. 2 and 3, the object to be measured, in this case again a metal wire, is indicated with reference number 10. Again, the metal wire 10 is conveyed along its longitudinal direction, from left to right in FIG. 2. Unlike the exemplary embodiment according to FIG. 1, the metal wire 10 in the exemplary embodiment according to FIGS. 2 and 3 is guided by a wheel 48 heated by means of a heat source (not shown). The wheel 48 is driven in a rotating manner as illustrated in FIG. 2 by the arrow 50, and may also be provided with a drive. Again, the direction of travel of the object to be measured is inconsequential. The rotational direction shown in FIG. 2 is hence merely an example, and the invention can also be applied in the opposite direction when the conductor enters from the right in FIG. 2.

To guide the metal wire 10, the wheel 48, as can be seen in FIG. 3, has a groove 52 with a V-shaped cross-section that is formed along its running surface 54. It can also be useful to loop the metal wire 10 shown in FIG. 2 around the entire perimeter of the wheel 48. The surface of the groove 52 and possibly also the running surface 54 can be provided with a black coating to again largely approximate a black radiator. Furthermore, it can also be seen in FIGS. 2 and 3 that an additional radiation source is provided beyond the heated wheel 48 as the first radiation source, that is, a radiation source 56 with a U-shaped cross section that sectionally covers the wheel 48 and especially its groove 52 (see FIG. 3). The additional radiation source 56 is also provided with a black coating and can also be heated by means of a heating apparatus. It should again very closely approximate a black radiator.

Reference sign 58 marks an example of the average width of the groove 52. In the portrayed example, the depth of the groove is about twice as great as the average width 58 of the groove—in FIG. 3 from the running surface 54 extending vertically downward to the tip of the groove 52. The temperature of the groove 52 accommodating and guiding the metal wire is crucial to the precise measurement of the temperature of the metal wire 10.

In FIG. 2, reference number 16 in turn indicates a spatially resolving thermal imaging camera the measuring field of which is identified with reference number 18, and an imaging lens system is identified with reference number 20. The primary direction of measurement 22 again runs obliquely at an angle to the direction of movement of the metal wire 10 in the measuring range, namely through a measuring opening 57 in the additional radiation source 56. Furthermore, the thermal imaging camera 16 can be aligned such that a spatially-resolved temperature measurement occurs at least transversely to the direction of movement of the metal wire 10—in FIG. 3 from left to right or respectively vice versa. The additional radiation source 56 can possess a suitable measuring opening such that the thermal imaging camera 16 can measure through the additional radiation source 56. The thermal imaging camera 16 then detects the wheel 48, especially the running surface 54 and groove 52 including the metal wire 10 guided therein.

The embodiment according to FIGS. 2 and 3 is particularly suitable for metal wires 10 that vibrate strongly while moving. The embodiment according to FIGS. 2 and 3 achieves a particularly defined guidance of the metal wire 10. The measurement of the temperature of the metal wire 10 and its evaluation and possible regulation can occur in a manner analogous to that explained above with regard to FIG. 1.

Figure 4A:
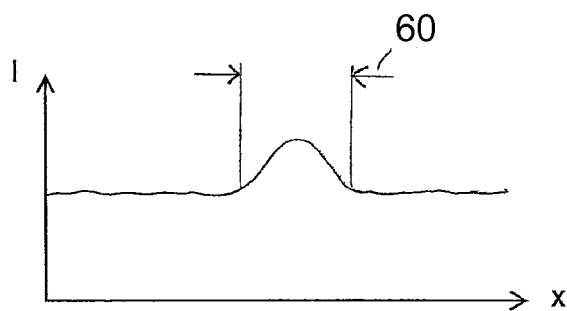
FIG. 4A is an exemplary diagram as can be recorded by a device according to the invention.

FIG. 4A shows an example of a diagram as can be recorded by the device according to the invention depicted in FIG. 1 or FIGS. 2 and 3. In the diagram, the intensity I recorded by the spatially-resolving thermal imaging camera 16 is plotted over the location x. As can be seen in FIG. 4A, the intensity measurement occurs over a larger region. In particular, the thermal imaging camera detects the metal wire 10 to be measured as well as the cavity radiator 12 on both sides next to the metal wire surrounding it, or respectively the heated wheel 48 with the groove 52 surrounding it. In the example shown in FIG. 4A, the temperature of the measured metal wire 10 is higher than that of the surrounding radiation source, i.e., the cavity radiator 12 or respectively the heated wheel 48 with its groove 52. The measured intensity is correspondingly elevated approximately in the middle of the region detected during the spatially-resolved measurement. As indicated in FIG. 4A with reference number 60, the diameter of the metal wire can be inferred from the width of the maximum intensity generated by the metal wire 10.

Figure 4B:
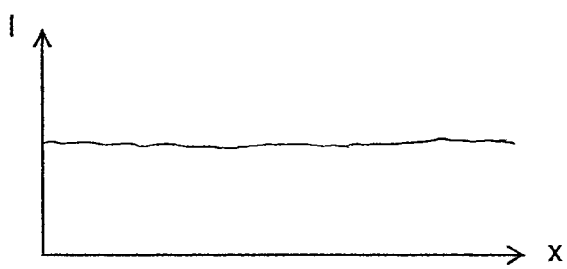
FIG. 4B is an additional exemplary diagram as can be recorded by a device according to the invention.

FIG. 4B shows a diagram similar to that depicted in FIG. 4A. However in this case, the metal wire 10 possesses substantially the same temperature as the surrounding radiation source, i.e., in particular the cavity radiator 12 or respectively the heated wheel 48 with its groove 52. The intensity I in this case is correspondingly substantially constant over the entire measured region. To the extent that, for example, the surrounding radiation source is heated to the target temperature of the metal wire 10, the measurement depicted in FIG. 4B means that the metal wire also possesses this target temperature. Upon detecting deviations caused by the metal wire 10 from the intensity which is substantially constant over the entire region, the temperature of the metal wire 10 can be correspondingly regulated.

Figure 4C:
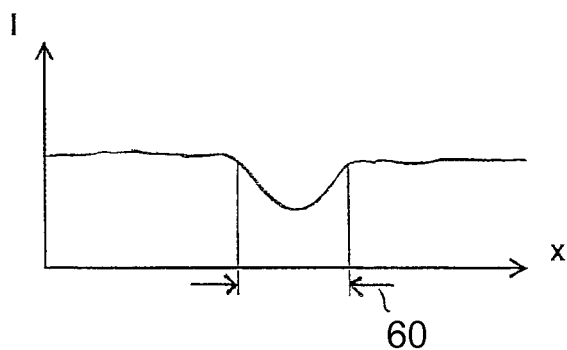
FIG. 4C is an additional exemplary diagram as can be recorded by a device according to the invention.

FIG. 4C in turn shows a similar diagram as depicted in FIGS. 4A and 4B, although in this case the temperature of the metal wire 10 is lower than that of the surrounding radiation source, i.e., in particular the cavity radiator 12 or respectively the heated wheel 48 with the groove 52. In this case, a minimum intensity is correspondingly formed that is complementary to the maximum intensity shown in FIG. 4A. As indicated by reference number 60, the diameter of the metal wire 10 can again be inferred therefrom. As explained above, conclusions about the temperature of the metal wire 10 can be drawn from the deviation from the maximum in FIG. 4A or respectively the minimum in FIG. 4C relative to the intensity that is also measured.

Figure 5:
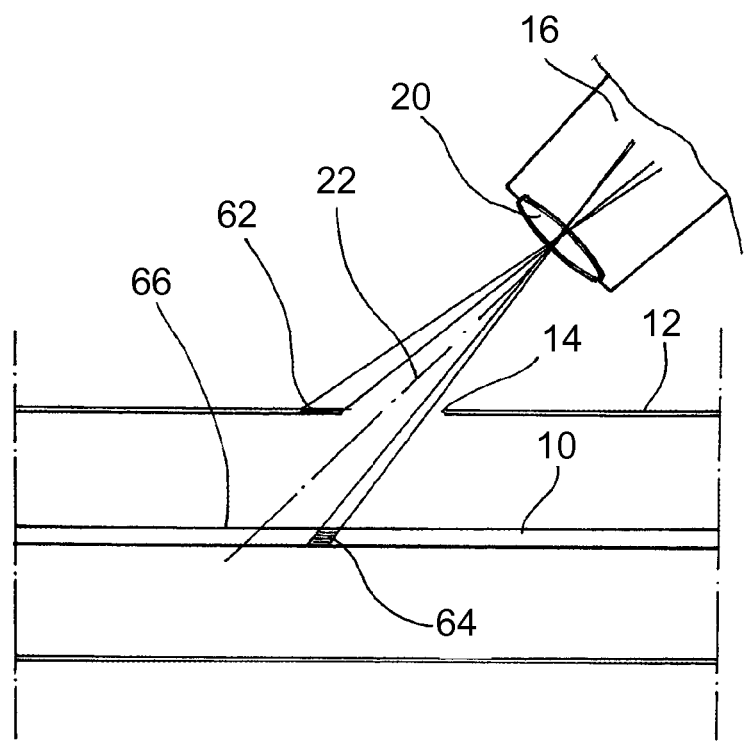
FIG. 5 is a sectional view of the device from FIG. 1 according to an additional exemplary embodiment.

In the exemplary embodiment shown in FIG. 5, the imaging lens system 20 of the thermal imaging camera 16 is designed such that the spatially-resolved thermal radiation measurement detects a section 62 of the outer surface of the cavity radiator 12 delimiting the measuring opening 14 in addition to the thermal radiation measurement through the measuring opening 14. In addition, the spatially-resolved thermal radiation measurement through the measuring opening 14 detects a first region 64 in which the metal wire 10 is located below the measuring opening 14 perpendicular to its direction of movement (along its longitudinal direction in FIG. 5 from right to left) as well as a second region 66 in which the metal wire 10 is not located below the measuring opening 14 perpendicular to its direction of movement, but is instead completely surrounded by the inner surface of the cavity radiator 12.

For evaluation, a difference is evaluated in the present case between the thermal radiation emitted and possibly reflected by the cavity radiator 12 in the section 62, and the thermal radiation emitted and reflected by the metal wire 10 in the second region 66. The first region 64 is used to precisely determine the position of the metal wire 10 in the measuring field of the thermal imaging camera 16. This will be explained with reference to FIG. 6. The first region 64 is arranged in FIG. 6 in the left part of the thermal radiation distribution, wherein the metal wire 10 is depicted as a dark spot 68 in the first region 64 in FIG. 6. The reason for this is that the metal wire 10 in the first region 64 is not exposed to the thermal radiation of the cavity radiator 12 in the region of the measuring opening 14, and it hence appears as a dark, i.e., comparatively cold, region in the thermal image. On this basis, the position of the metal wire 10 can be reliably determined in the measuring field. The position of the metal wire 10 can now be inferred in the middle part in FIG. 6, which corresponds to the second region 66 from FIG. 5. In the portrayed example, the conductor lies in the region identified with 70 in FIG. 6. The thermal radiation values detected in this region are used to form the difference of the thermal radiation emitted and reflected by the metal wire 10.

Figure 6:
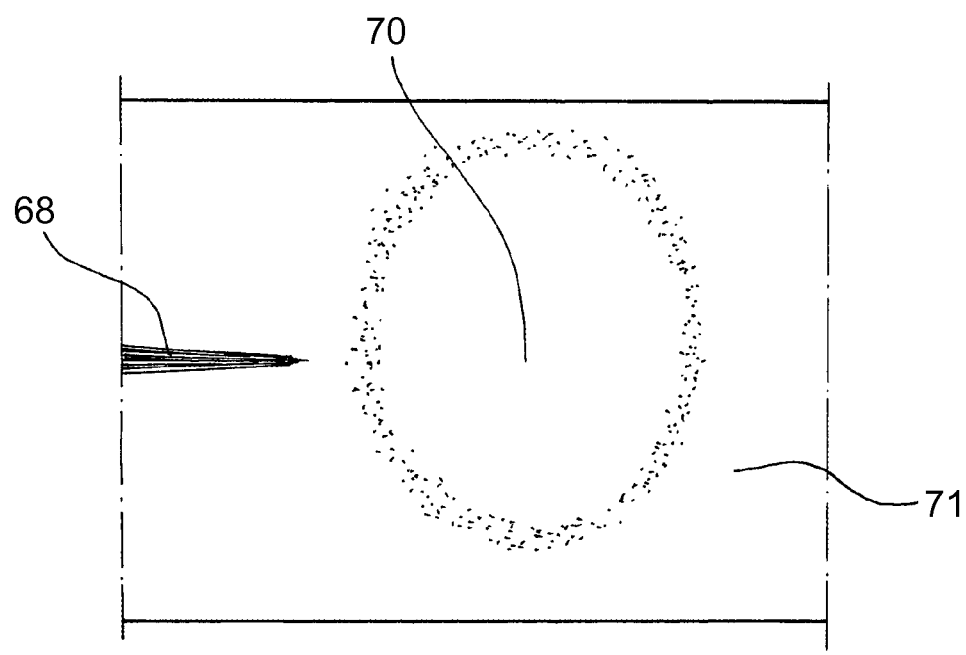
FIG. 6 is an image of a spatially-resolved thermal radiation measurement taken with the setup of FIG. 5.
Figure 7:
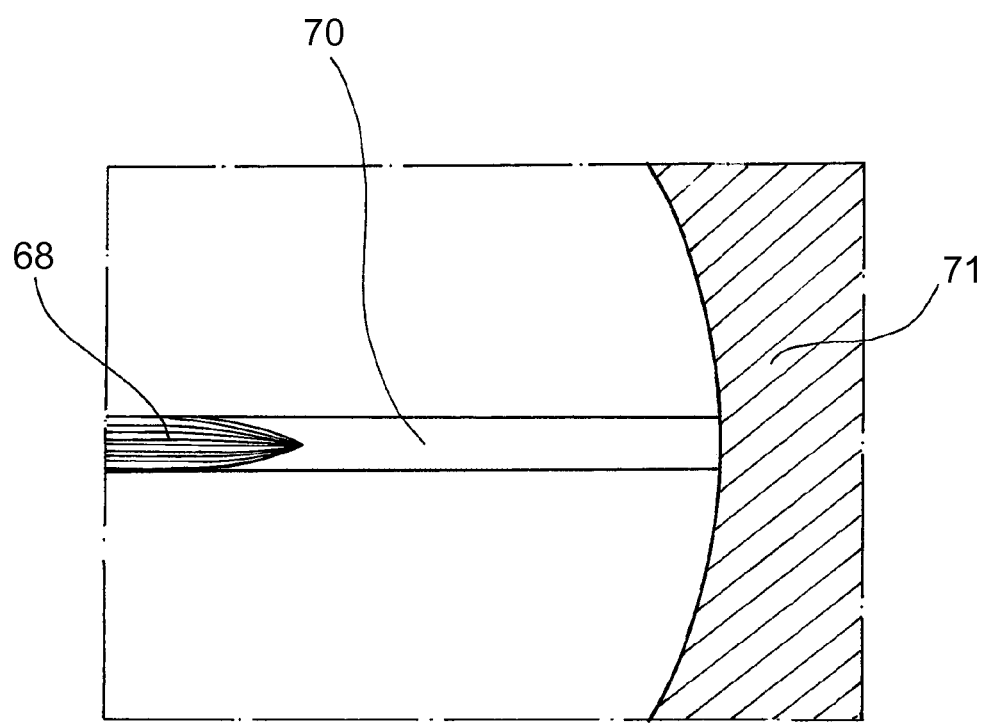
FIG. 7 is a diagram of FIG. 6.

FIG. 7 is a diagram of the subject matter from FIG. 6. At position 68 in FIG. 7, a part of the conductor can be seen that is located almost perpendicular below the measuring opening and only experiences reduced irradiation. In FIG. 5, this position is designated 64. In the right part of FIG. 6, the detector (thermal imaging camera) is directed towards the outer surface of the cavity radiator (see 62 in FIG. 5). In FIG. 7, this position is designated 71.

The advantage of detecting the temperature of the outer surface of the cavity radiator is that this surface remains free of soiling or scratches for a long period. The inner surface of the cavity radiator is exposed to completely different loads related to production. Copper conductors produce copper dust, which partially collects on the inner surface.

The invention claimed is:

1. A method for contactlessly determining the temperature of a moving object having an unknown degree of emission, comprising:
   guiding the object through at least one radiation source emitting thermal radiation of a known temperature, wherein the object is mostly or completely surrounded by the at least one radiation source;
   performing, with at least one radiation detector, a spatially-resolved thermal radiation measurement in a region through which the object passes when it is guided through the at least one radiation source, wherein the at least one radiation detector detects the radiation of the at least one radiation source in addition to the object to be measured in its background; and
   measuring the temperature of the moving object on the basis of the spatially-resolved thermal radiation measurement by evaluating a difference between the measured thermal radiation emitted by and any reflected by the at least one radiation source and the measured thermal radiation emitted and reflected by the moving object, wherein the at least one radiation source comprises a cavity radiator with an inlet opening and an outlet opening, wherein the object is guided through the inlet opening and the outlet opening through the cavity radiator, and wherein the cavity radiator comprises at least one measuring opening through which the spatially-resolved thermal radiation measurement occurs, wherein the at least one radiation detector detects a first region through the measuring opening in which the moving object is located below the measuring opening viewed perpendicular relative to its direction of movement, as well as a second region in which the moving object is not below the measuring opening when viewed perpendicular to its direction of movement, and wherein a position of the moving object is determined using the measured values from the first region and a position of the moving object in the second region is deduced therefrom, wherein the thermal radiation emitted and reflected by the moving object measured in this position of the second region is used to form the difference.

2. The method according to claim 1, wherein the at least one radiation source comprises at least one radiator approximating a black radiator as closely as possible.

3. The method according to claim 1, wherein the spatially-resolved thermal radiation measurement occurs by swinging the least one radiation detector.

4. The method according to claim 1, wherein the spatially-resolved thermal radiation measurement is performed by a thermal imaging camera.

5. The method according to claim 1, wherein the spatially-resolved thermal radiation measurement is performed through the at least one measuring opening in a direction that is at an angle relative to the longitudinal axis of the object of 30° to 60°.

6. The method according to claim 1, wherein the at least one radiation detector is directed toward the measuring opening of the cavity detector and toward a section of the outer surface of the cavity detector to delimit the measuring opening, wherein the thermal radiation emitted by the cavity radiator in the section of the outer surface of the cavity radiator is used to form the difference.

7. The method according to claim 1, further comprising:
measuring the temperature of the at least one radiation source.

8. The method according to claim 7, further comprising:
regulating the temperature of the at least one radiation source to a set temperature value.

9. The method according to claim 1, further comprising:
determining a diameter of the moving object from a difference between the measured thermal radiation emitted by the at least one radiation source and the measured thermal radiation emitted and reflected by the moving object.

10. The method according to claim 1, further comprising:
regulating the temperature of the moving object to a setpoint based on the detected temperature of the moving object.

11. A device for contactlessly determining the temperature of a moving object having an unknown degree of emission, comprising:
at least one radiation source emitting thermal radiation, of a known temperature;
a guide apparatus by means of which the moving object is guided through the at least one radiation source, wherein the object is mostly or completely surrounded by the at least one radiation source;
at least one radiation detector, which is designed to perform a spatially-resolved thermal radiation measurement in a region through which the object passes when it is guided through the at least one radiation source, wherein the at least one radiation detector detects the radiation of the at least one radiation source in addition to the object to be measured in its background; and
an evaluation apparatus which is designed to determine the temperature of the moving object based on the spatially-resolved thermal radiation measurement by evaluating a difference between the measured thermal radiation emitted by and any reflected by the at least one radiation source, and the measured thermal radiation emitted and reflected by the moving object, wherein the at least one radiation source comprises a cavity radiator with an inlet opening and an outlet opening, wherein the guide apparatus is designed to guide the object through the inlet opening and the outlet opening through the cavity radiator, wherein the cavity radiator comprises at least one measuring opening, and wherein the at least one radiation detector is aligned such that the spatially-resolved thermal radiation measurement is performed through the at least one measuring opening, wherein the radiation detector for the spatially-resolved thermal radiation measurement detects a first region through the measuring opening in which the moving object is located below the measuring opening viewed perpendicular to its direction of movement, as well as a second region in which the moving object is not located below the measuring opening perpendicular to its direction of movement, and wherein the evaluation apparatus determines a position of the moving object using the measured values from the first region, and a position of the moving object in the second region is deduced therefrom, wherein the evaluation apparatus uses thermal radiation emitted and reflected by the moving object measured in this position of the second region to form the difference.

12. The device according to claim 11, wherein the at least one radiation source comprises at least one radiator approximating a black radiator as closely as possible.

13. The device according to claim 11, further comprising:
a movement device by means of which the least one radiation detector is swung.

14. The device according to claim 11, wherein the at least one radiation detector a thermal imaging camera.

15. The device according to claim 11, wherein the at least one radiation detector is aligned such that the thermal radiation measurement is performed through the at least one measuring opening in a direction that is at an angle relative to the longitudinal axis of the object.

16. The device according to claim 11, wherein the at least one radiation detector is directed toward the measuring opening of the cavity detector and toward a section of the outer surface of the cavity detector to delimit the measuring opening, wherein the evaluation apparatus for forming the difference uses the thermal radiation emitted by the cavity radiator in the section of the outer surface of the cavity radiator.

17. The device according to claim 11, further comprising:
an additional temperature measuring device to measure the temperature of the at least one radiation source.

18. The device according to claim 17, further comprising:
a heating apparatus to heat the at least one radiation source; and
a regulation apparatus designed to control the heating apparatus such that the temperature of the at least one radiation source assumes a target temperature value.

19. The device according to claim 11, wherein the evaluation apparatus is designed to determine a dimension of the moving object from a difference between the measured thermal radiation emitted by and any reflected by the at least one radiation source and the measured thermal radiation emitted and reflected by the moving object.

20. The device according to claim 11, further comprising:
a heating apparatus to heat the moving object; and
a regulation apparatus designed to control the heating apparatus based on the determined temperature of the moving object such that the temperature of the moving object assumes a target temperature value.

* * * * *